(12) United States Patent
Todd et al.

(10) Patent No.: US 6,257,746 B1
(45) Date of Patent: Jul. 10, 2001

(54) SIGNALLING ASSEMBLY

(75) Inventors: Daniel R. Todd; Daniel J. Mathieu; Allen A. Bukosky; Jason J. Lawrence, all of Sheboygan, WI (US)

(73) Assignee: K. W. Muth Company, Inc., Sheboygan, WI (US)

( * ) Notice: Subject to any disclaimer, the term of this patent is extended or adjusted under 35 U.S.C. 154(b) by 0 days.

(21) Appl. No.: 09/185,665

(22) Filed: Nov. 3, 1998

(51) Int. Cl.$^7$ ............................................. B60B 1/00
(52) U.S. Cl. ................ 362/494; 362/140; 362/141; 362/540; 362/545; 362/544
(58) Field of Search ................... 362/494, 140, 362/141, 540, 545, 544

(56) References Cited

U.S. PATENT DOCUMENTS

| | | | |
|---|---|---|---|
| Re. 32,576 | 1/1988 | Pastore | 350/600 |
| 2,060,401 | 11/1936 | Smith | 177/329 |
| 2,180,610 | 11/1939 | Ritz-Woller | 240/4.2 |
| 2,190,123 | 2/1940 | Pace | 177/329 |
| 2,263,382 | 11/1941 | Gotzinger | 177/329 |
| 2,580,014 | 12/1951 | Gazda | 177/329 |
| 2,595,331 | 5/1952 | Calihan et al. | 177/329 |
| 3,040,207 | 6/1962 | Grontkowski | 315/77 |
| 3,266,016 | 8/1966 | Maruyama et al. | 340/98 |
| 3,436,758 | 4/1969 | Kluth | 340/376 |
| 3,449,626 | 6/1969 | De Coye De Castelet | 315/77 |
| 3,532,871 | 10/1970 | Shipman | 240/7.1 |
| 3,543,018 | 11/1970 | Barus et al. | 240/4.2 |
| 3,665,392 | 5/1972 | Annas | 340/67 |
| 3,840,851 | 10/1974 | Fowler et al. | 340/74 |
| 4,005,928 | 2/1977 | Kmetz et al. | 350/160 |
| 4,023,029 | 5/1977 | Fischer | 240/4.2 |
| 4,040,726 | 8/1977 | Paca | 350/288 |
| 4,066,332 | 1/1978 | Kato et al. | 350/126 |
| 4,158,483 | 6/1979 | Fisher et al. | 350/289 |
| 4,274,078 | 6/1981 | Isobe et al. | 340/98 |
| 4,299,444 | 11/1981 | Romer | 350/278 |
| 4,443,057 | 4/1984 | Bauer et al. | 350/281 |
| 4,463,411 | 7/1984 | Proctor | 362/61 |
| 4,475,100 | 10/1984 | Duh | 340/98 |
| 4,479,172 | 10/1984 | Connor | 362/135 |
| 4,491,390 | 1/1985 | Tong-Shen | 350/331 |
| 4,499,451 | 2/1985 | Suzuki et al. | 340/98 |
| 4,506,315 | 3/1985 | Maekawa et al. | 362/308 |
| 4,516,197 | 5/1985 | Yonkers | 362/342 |
| 4,583,155 | 4/1986 | Hart | 362/285 |
| 4,588,267 | 5/1986 | Pastore | 350/600 |
| 4,591,954 | 5/1986 | Kawamura et al. | 362/61 |
| 4,603,946 | 8/1986 | Kato et al. | 350/331 |
| 4,613,791 | 9/1986 | Kurihara et al. | 315/82 |
| 4,623,222 | 11/1986 | Itoh et al. | 350/331 |
| 4,626,967 | 12/1986 | Segoshi | 362/61 |
| 4,630,904 | 12/1986 | Pastore | 350/600 |
| 4,646,210 | 2/1987 | Skogler et al. | 362/142 |
| 4,659,967 | 4/1987 | Dahl | 315/307 |
| 4,665,321 | 5/1987 | Chang et al. | 307/10 |
| 4,701,022 | 10/1987 | Jacob | 350/278 |
| 4,721,364 | 1/1988 | Itoh et al. | 350/332 |

(List continued on next page.)

FOREIGN PATENT DOCUMENTS

| | | |
|---|---|---|
| 1141966 | 8/1971 | (AU) . |
| 268359 | 7/1927 | (GB) . |
| 1172382 | 11/1969 | (GB) . |

Primary Examiner—Sandra O'Shea
Assistant Examiner—Anabel M Ton
(74) Attorney, Agent, or Firm—Wells, St. John, Roberts, Gregory & Matkin, P.S.

(57) ABSTRACT

A signaling assembly is described and which includes a semitransparent substrate, a light emitting assembly which is disposed in spaced relationship relative to the semitransparent substrate and which when energized emits electromagnetic radiation; and an opaque light orientation assembly which is positioned adjacent to the semitransparent substrate and which permits electromagnetic radiation to pass through the semitransparent substrate at an oblique orientation.

13 Claims, 6 Drawing Sheets

U.S. PATENT DOCUMENTS

| | | | |
|---|---|---|---|
| 4,733,335 | 3/1988 | Serizawa et al. | 362/80 |
| 4,733,336 | 3/1988 | Skogler et al. | 362/142 |
| 4,791,534 | 12/1988 | Lindberg | 362/80 |
| 4,793,690 | 12/1988 | Gahan et al. | 350/279 |
| 4,799,768 | 1/1989 | Gahan | 350/279 |
| 4,807,096 | 2/1989 | Skogler et al. | 362/142 |
| 4,841,198 | 6/1989 | Wilhelm | 315/82 |
| 4,862,330 | 8/1989 | Machida et al. | 362/61 |
| 4,868,459 | 9/1989 | Dennerlein et al. | 315/158 |
| 4,868,719 | 9/1989 | Kouchi et al. | 362/61 |
| 4,882,565 | 11/1989 | Gallmeyer | 340/461 |
| 4,886,960 | 12/1989 | Molyneux et al. | 250/209 |
| 4,893,063 | 1/1990 | Pernyeszi | 315/307 |
| 4,916,430 | 4/1990 | Vu et al. | 340/463 |
| 4,917,477 | 4/1990 | Bechtel et al. | 350/357 |
| 4,929,866 | 5/1990 | Murata et al. | 313/500 |
| 4,935,665 | 6/1990 | Murata | 313/500 |
| 4,951,179 | 8/1990 | Machida | 362/61 |
| 5,014,167 | 5/1991 | Roberts | 362/83.1 |
| 5,029,060 | 7/1991 | Aho et al. | 362/299 |
| 5,050,051 | 9/1991 | Machida et al. | 362/80.1 |
| 5,059,015 | 10/1991 | Tran | 359/844 |
| 5,072,340 | 12/1991 | Jones | 362/80 |
| 5,093,768 | 3/1992 | Ohe | 362/241 |
| 5,097,395 | 3/1992 | Aho et al. | 362/32 |
| 5,150,966 | 9/1992 | Nelson | 362/337 |
| 5,165,772 | 11/1992 | Wu | 362/26 |
| 5,174,649 | 12/1992 | Alston | 362/244 |
| 5,207,492 | 5/1993 | Roberts | 362/30 |
| 5,211,466 | 5/1993 | Jarocki et al. | 362/83.3 |
| 5,241,457 | 8/1993 | Sasajima et al. | 362/80.1 |
| 5,272,602 | 12/1993 | Sasajima et al. | 362/80.1 |
| 5,285,060 | 2/1994 | Larson et al. | 250/214 |
| 5,303,130 | 4/1994 | Wei et al. | 362/83.1 |
| 5,355,284 | 10/1994 | Roberts | 362/30 |
| 5,361,190 | 11/1994 | Roberts et al. | 362/61 |
| 5,371,659 | 12/1994 | Pastrick et al. | 362/83.1 |
| 5,388,035 | 2/1995 | Bodem, Jr. | 362/61 |
| 5,402,103 | 3/1995 | Tashiro | 340/475 |
| 5,404,869 | 4/1995 | Parkyn, Jr. et al. | 126/699 |
| 5,436,741 | 7/1995 | Crandall | 359/15 |
| 5,436,809 | 7/1995 | Brassier et al. | 362/61 |
| 5,438,487 | 8/1995 | Schmid et al. | 362/61 |
| 5,481,409 | 1/1996 | Roberts | 359/839 |
| 5,497,305 | 3/1996 | Pastrick et al. | 362/83.1 |
| 5,497,306 | 3/1996 | Pastrick | 362/83.1 |
| 5,528,422 | 6/1996 | Roberts | 359/583 |
| 5,530,240 | 6/1996 | Larson et al. | 250/214 AL |
| 5,587,699 | 12/1996 | Faloon et al. | 340/475 |
| 5,788,357 | 8/1998 | Muth et al. | 362/83.1 |
| 5,938,320 * | 8/1999 | Crandall | 362/494 |
| 6,045,243 * | 4/2000 | Muth et al. | 362/494 |
| 6,086,229 * | 7/2000 | Pastrick | 362/494 |
| 6,111,683 * | 8/2000 | Cammenga et al. | 359/267 |
| 6,149,287 * | 11/2000 | Pastrick et al. | 362/494 |

* cited by examiner

SIGNALLING ASSEMBLY

TECHNICAL FIELD

The present invention relates to a signalling assembly, and more specifically, to a signalling assembly which has particular utility when coupled with the controls of an overland vehicle, or the like, and which in one form of the invention operates as a combined directional signalling lamp and rear view mirror assembly.

DESCRIPTION OF THE PRIOR ART

The beneficial effects of employing auxiliary signalling assemblies have been disclosed in various United States patents, including U.S. Pat. Nos. 5,014,167; 5,207,492; 5,355,284; 5,361,190; 5,481,409; 5,528,422, and 5,788,357, all of which are incorporated by reference herein. The mirror assemblies disclosed in the above-captioned patents employ semitransparent mirrors, some of which are dichroic, and which are operable to reflect a broad band of electromagnetic radiation, within the visible light portion of the spectrum, while simultaneously permitting electromagnetic radiation having wavelengths which reside within a predetermined spectral band to pass therethrough. In this fashion, the dichroic mirror remains an excellent visual image reflector, that is, achieving luminous reflectance which is acceptable for automotive and other industrial applications, for example, while simultaneously achieving an average transmittance which is commercially acceptable. Further, when these assemblies use dichroic mirrors, and the predetermined band pass region of the electromagnetic radiation is relatively narrow, that is, such as about 30 nanometers, average in-band transmittance of 80%, or more of the electromagnetic radiation, can be achieved, with peak transmittance in excess of 90% being common.

In U.S. Pat. No. 5,788,357, which issued on Aug. 4, 1998, the inventors disclosed a mirror assembly which utilizes a nondichroic semitransparent mirror which passes about 1% to less than about 8% of a broad band of visible light and which simultaneously reflects about 35% to about 58% of a broad band of visible light; and a light assembly positioned adjacent to the semitransparent mirror and which emits visible light which is passed by the semitransparent mirror, the luminous intensity of the mirror assembly being about 2 to about 20 candelas. Further, in U.S. Pat. No. 5,528,422, a plurality of mirror coatings were disclosed and which are operable to conceal an underlying sensor or light emitting assembly while simultaneously providing a neutrally chromatic appearance. These same mirror coatings simultaneously absorb wavelengths of electromagnetic radiation which may otherwise be transmitted into the mirror assembly and which would, over time, degrade or otherwise be harmful to the subassemblies which are concealed by the semitransparent mirror.

Still further, in U.S. patent application Ser. No. 09/123, 047 and which was filed on Jul. 27, 1998, the inventors have disclosed a mirror assembly having a semitransparent mirror which passes about 1% to about 30% of a broad band of visible light, and which reflects less than about 80% of a broad band of visible light; and a light assembly positioned adjacent to the semitransparent mirror and which emits visible light which is passed by the semitransparent mirror, the luminous intensity of the mirror assembly being less than about 120 candelas. The teachings of this application are also incorporated by reference herein.

Yet further in U.S. patent application Ser. No. 09/166,561, filed Oct. 5, 1998, the inventor has disclosed a mirror coating which may be useful in similar applications. In this patent application a mirror coating is disclosed as comprising a primary region which reflects visibly discernible electromagnetic radiation, and a secondary region which passes a portion of the visibly discernible electromagnetic radiation while simultaneously reflecting a given percentage of the visibly discernible electromagnetic radiation, and wherein the average reflectance of the mirror coating is greater than about 50%. The teachings of this reference are also incorporated by reference herein.

While the devices disclosed in these patents and applications have realized some degree of commercial success, certain inherent physical characteristics of the earlier disclosed mirror assemblies have impeded manufacturing efforts to cost-effectively mass produce these same assemblies. For example, while the mirror coatings disclosed in U.S. Pat. No. 5,528,422 operate as described, the manufacturing difficulties and costs associated with producing these rather complex coatings with commercially available coating fabrication equipment has impeded the introduction of low cost products for the mass market.

Still further, many of the devices disclosed in the earlier patents comprise numerous subassemblies, including light control film, lenses, and other diffractive devices which are utilized to collimate or otherwise bend the light emitted by the underlying light emitting assembly in such a fashion so as to direct the light in a given orientation away from an observer's eyes and into a given field of view outwardly of an overland vehicle. While these devices have operated with success, the space occupied by these subassemblies, and the weight attributed to same, have in some operating environments, and under certain conditions, detracted from their usefulness.

Still other prior art devices have attempted to diverge from the teachings provided in the patents and applications noted above. These devices, however, when built in accordance with their teachings, have been unable to provide the same performance characteristics. An example of such prior art is the patent to Crandall, U.S. Pat. No. 5,436,741. Other prior art references describe devices which attempt to provide the same functional benefits as described in the earlier patents. These references describe all manner of mirror housing modifications where, for example, lamps are located in various orientations to project light into predetermined areas, both internally and/or externally of the overland vehicle and to further provide auxiliary signalling capability. Examples of such patents include U.S. Pat. Nos. 4,646,210; 4,916,430; 5,059,015; 5,303,130; 5,371,659; 5,402,103; and 5,497,306, to name but a few.

Other prior art references have attempted to provide a combined mirror and signalling assembly. These assemblies have employed a nondichroic, semitransparent mirror with same. Perhaps the most germane patent which discloses this type of assembly is the patent to Maruyama et al., U.S. Pat. No. 3,266,016. This reference is, however, devoid of any suggestion of how one could manufacture a device which would have acceptable reflectivity and an acceptable luminous output while avoiding the detriments associated with the build-up or accumulation of heat within the mirror housing; and further address the associated problem of space limitations within the same mirror housing. The heat problem discussed above, of course, is a by-product of the electrical lamps used with same.

In the present invention, the inventors have departed from the teachings of the prior art by providing a signalling assembly which utilizes a semitransparent substrate, and a light assembly which, in combination, produces a signalling assembly which has a luminous intensity which is commercially acceptable, while simultaneously maintaining an acceptable luminous reflectivity, and a substantially neutral chromatic appearance. The present invention further eliminates many of the subassemblies utilized in the previous prior art devices, thereby minimizing its overall thickness, and weight. This is all achieved in a device which can be manufactured in a cost-effective fashion, not possible heretofore, and which further has improved performance characteristics.

OBJECTS AND SUMMARY OF THE INVENTION

Therefore, one aspect of the present invention is to provide an improved signalling assembly.

Another aspect of the present invention is to provide a signalling assembly which may be manufactured and installed as original equipment on an overland vehicle and the like or which may be further manufactured in the manner of a retrofit.

Another aspect of the present invention is to provide a signalling assembly which may be readily installed or integrated with other mirror technologies such as motorized actuators, heater elements, and electrochromic dimming devices, of various designs.

Another aspect of the present invention is to provide a signalling assembly which includes a semitransparent substrate; a light emitting assembly which is disposed in spaced relation relative to the semitransparent substrate and which, when energized, emits electromagnetic radiation; and an opaque light orientation assembly which is positioned adjacent to the semitransparent substrate and which permits electromagnetic radiation to pass through the semitransparent substrate at an oblique orientation.

Another aspect of the present invention is to provide a signalling assembly which includes a light emitting assembly positioned adjacent to a semitransparent mirror and which emits visible light which is passed by the semitransparent mirror, the luminous intensity of the mirror assembly being about 0.5 to about 120 candelas.

Another aspect of the present invention is to provide a semitransparent substrate which is utilized with the signalling assembly of the present invention and which is operable to pass less than about 30% of substantially all visible light and which further reflects less than about 80% of substantially all ambient light.

Another aspect of the present invention relates to a signalling assembly which includes a light emitting assembly; an opaque substrate, a light diverting substrate; and a light emitting assembly which has a weight of less than about 100 grams.

Another aspect of the present invention is to provide a signalling assembly which has a light emitting assembly which has a given surface area, and which is less than about 50% of the total surface area of the semitransparent substrate.

Yet another aspect of the present invention is to provide a signalling assembly which is operable to obtain the individual benefits to be derived from related prior art assemblies and devices while avoiding the detriments individually associated therewith.

Further aspects and advantages are to provide improved elements and arrangements thereof in a signalling assembly for the purposes described and which is dependable, economical, durable, and fully effective in accomplishing these intended purposes.

These and other aspects and advantages of the present invention are achieved in a signalling assembly as provided for hereinafter, the signalling assembly comprising a semitransparent substrate; a light emitting assembly which is obliquely oriented relative to the semitransparent substrate; and an opaque light orientation assembly positioned adjacent to and in partial covering relation relative to the light emitting assembly, and intermediate the light emitting assembly and the semitransparent substrate.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
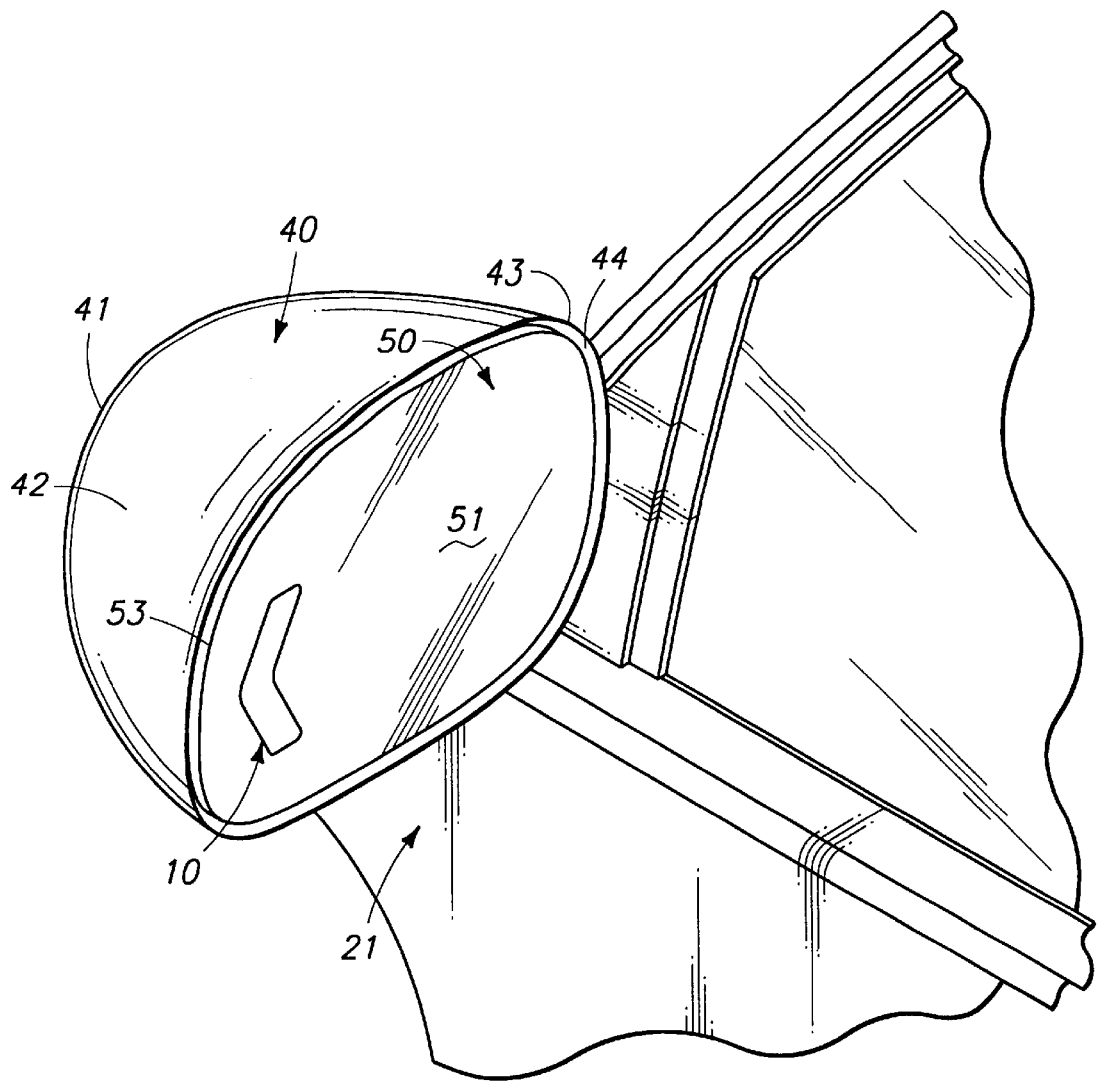
FIG. 1 is a perspective, environmental view of a mirror assembly of the present invention, shown mounted on an overland vehicle of conventional design, and illustrating the visual display produced by same when energized.

Referring more particularly to the drawings, the signalling assembly of the present invention is generally indicated by the numeral 10 in FIG. 1.

For illustrative convenience the mirror assembly 10 of the present invention, which is shown and described herein, is discussed as it would be configured if it were installed on an overland vehicle 11 of conventional design. As discussed in the earlier patents and applications which are incorporated by reference herein, the signalling assembly 10 of the present invention may be mounted on a vehicle, alternatively in place of the rearview mirror which is located in the passenger compartment, and/or in place of the exterior mounted side view mirrors. The mirror assembly 10 of the subject invention will be discussed in greater detail in the paragraphs which follow.

As noted earlier, the signalling assembly 10 is adapted to operate as a combination rearview mirror and visual signalling device, and wherein the visual signal it provides is capable of being seen, or detected from locations rearwardly of the overland vehicle 11 and which further cannot be readily seen under most circumstances by an operator of the same vehicle when energized, and which remains substantially covertly concealed behind the semitransparent mirror when deenergized, under most ambient lighting conditions.

As illustrated by reference to FIGS. 1 and 2 respectively, the signalling assembly 10 of the present invention is mounted on an overland vehicle 11 of conventional design. The overland vehicle has a front or forward portion 12, and a rear portion 13. The overland vehicle 11 further has a passenger compartment 14 which includes a front seat 15 and an operator's position 20. The overland vehicle 11 also includes locations 21 for a pair of exterior mounted rearview mirrors. The overland vehicle 11 also has a hand-operated directional signalling switch, and brake, not shown, and which when utilized provides a visual signal by means of an exterior mounted lamp which may alert drivers to other vehicles in the immediate vicinity that the overland vehicle 11 is about to change directions, turn, change lanes, stop, etc. Other signals may also be provided from other devices such as hazard warning switches and all manner of other signalling devices on the overland vehicle.

Figure 2:
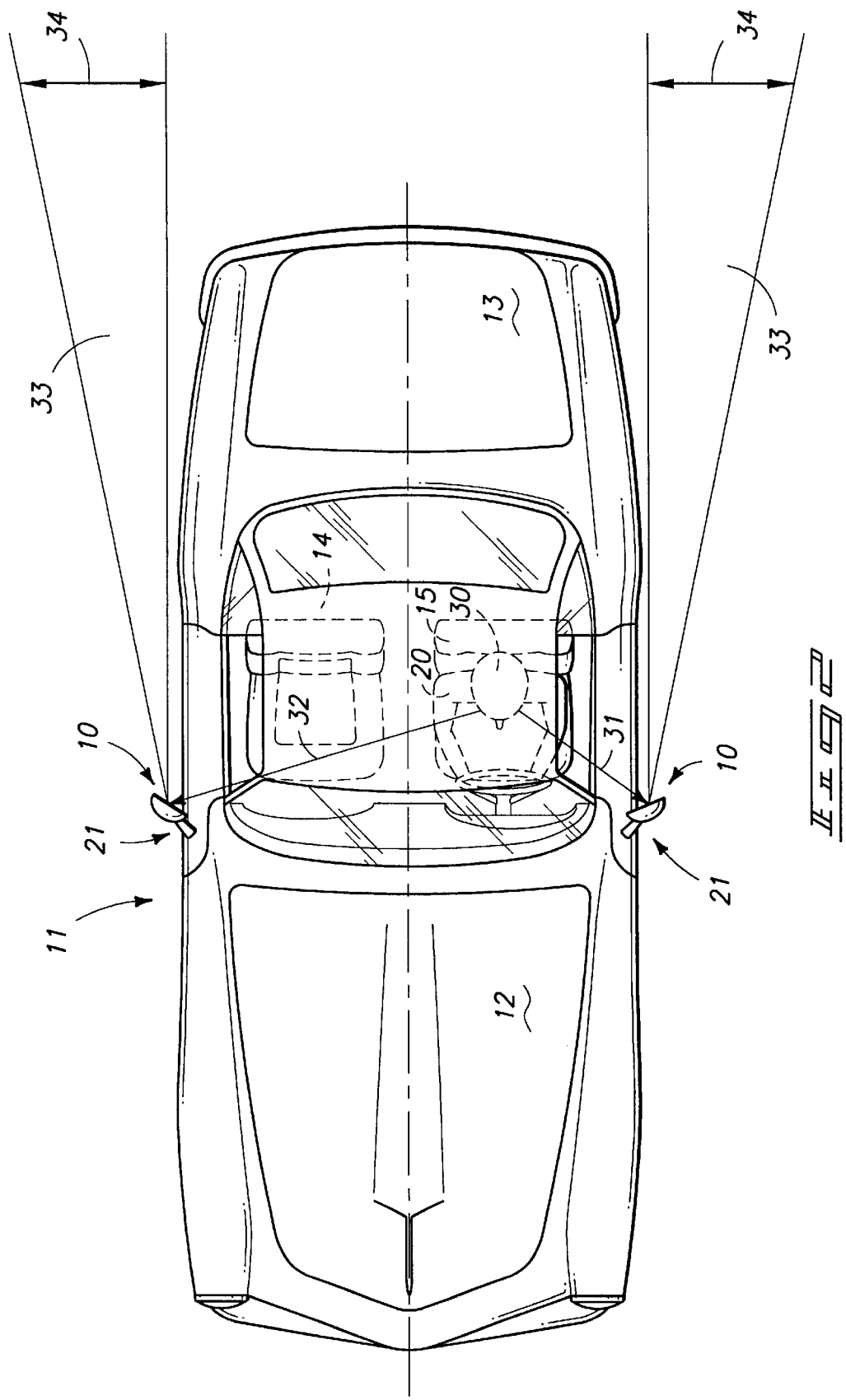
FIG. 2 is a top plan view of an overland vehicle of conventional design and which illustrates the approximate projected pattern of light as provided by the signalling assembly of the present invention when installed on an overland vehicle.

As best seen in FIG. 2 an operator 30 when positioned in the operator's position 20 has a field of view which extends approximately 180 degrees from the operator's position towards the forward portion 12 of the vehicle. Further and by using a pair of the signalling assemblies 10, which are located at the positions 21 on the exterior portion of the vehicle 11, the operator 30 may, by looking along predetermined lines of sight, view areas beyond his normal field of view, and rearwardly of the operator's position 20. In particular, the operator 30 has a first line of sight 31, which extends from the operator 30 to the signalling assembly 10, which is located on the driver's side of the overland vehicle 11. This allows the operator to view rearwardly of the vehicle on the driver's side thereof. The operator 30 has a second line of sight 32, which extends from the operator 30 to the passenger side of the overland vehicle, and therefore permits the operator to view rearwardly along the passenger side of the vehicle. Furthermore, the operator has a third line of sight (not shown) which extends from the operator's position 20 to the interior rearview mirror. As best depicted in FIG. 2, the signalling assembly 10 of the present invention provides illumination zones 33 which extend rearwardly of the vehicle 11 and are substantially out of the line of sight of the operator 30. The illumination zones 33 have a predetermined beam spread 34 of about 2 meters when measured at a distance of about 8 meters from the mirror assembly 10. When utilized on an overland vehicle as shown in FIG. 2, the deviation angle of the driver's side illumination zone as measured from a line perpendicular to the surface of the mirror assembly is about 30 degrees and the deviation angle for the passenger side illumination zone is about 25 degrees. It should be recognized, however, that various automotive platforms such as light trucks, and sports utility vehicles, may require somewhat different deviation angles because of the geometry of the vehicle involved.

Figure 3:
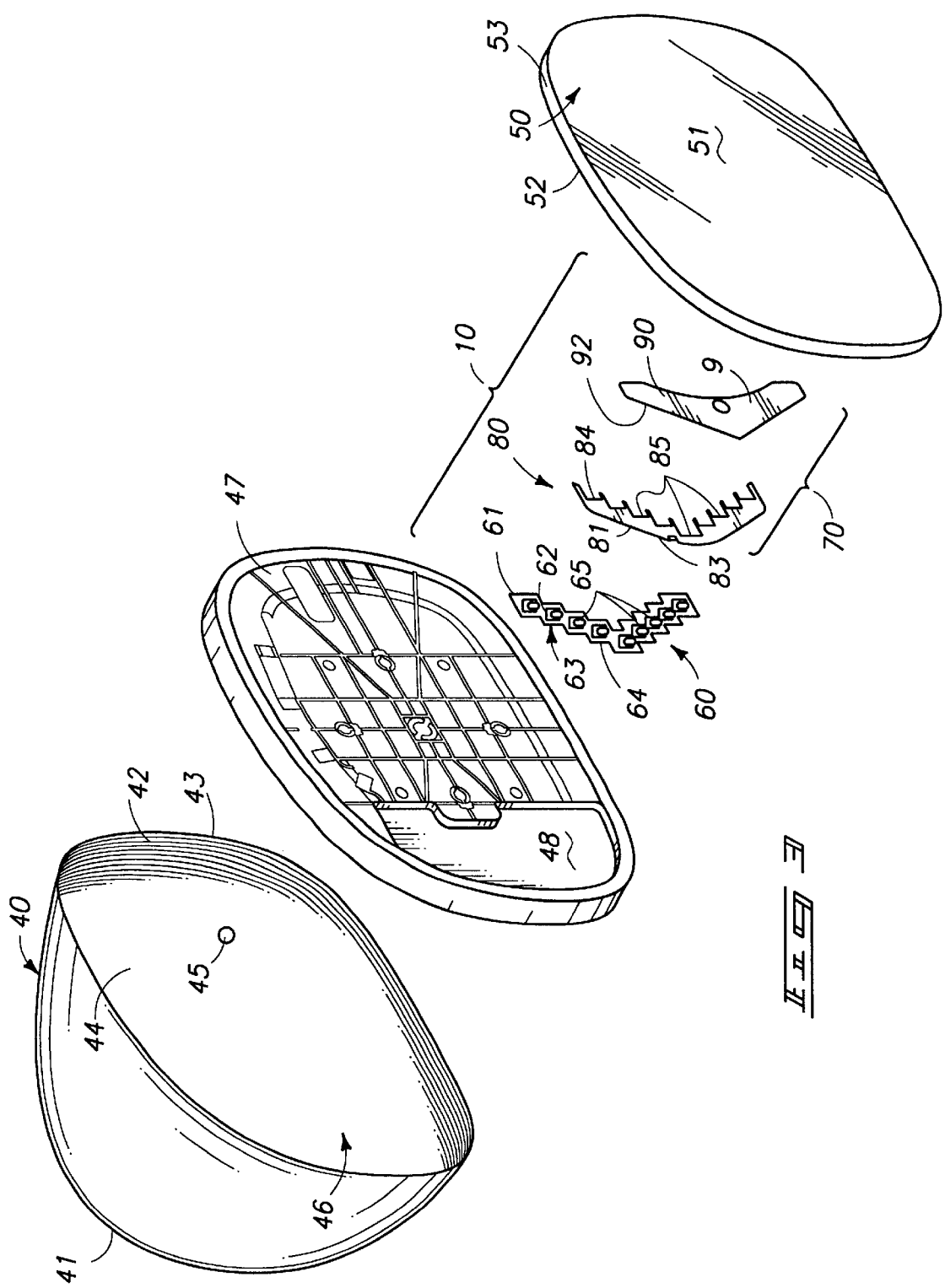
FIG. 3 is a partial, perspective, exploded view of the signalling assembly of the present invention.

Referring now to FIG. 3, the signalling assembly 10 of the present invention includes a mirror housing 40 which is operable to be mounted at the mirror locations 21 on the exterior portion of the overland vehicle 11. The mirror housing or enclosure 40 has a rearwall 41 and a sidewall 42 which extends outwardly therefrom. The sidewall has a peripheral edge 43 which defines an aperture 41 having given dimensions. Further, a smaller aperture 45 is formed in the sidewall 42. The rearwall 41 and the sidewall 42 define a cavity 46 which receives and partially encloses the signalling assembly 10 and other assemblies such as a bezel 47. It should be understood that the bezel provides a means by which the accompanying signalling assembly 10 may be movably supported within the housing and then can be readily adjusted, either manually or remotely as by a motorized actuator to a given angular orientation relative to the first and second lines of sight 31 and 32. This provides the means by which the operator 30 may adjust his given field of view. The bezel 47 defines a cavity 48 of predetermined dimensions.

The signalling assembly 10 of the invention as shown in FIG. 3 includes a semitransparent substantially neutrally chromatic substrate 50. The semitransparent substrate which is formed from conventional techniques passes less than about 30% of substantially all visible light and which further reflects less than about 80% of substantially all ambient light. The semitransparent substrate has a front or exterior facing surface 51 and an opposite rearwardly facing surface 52. Further, the semitransparent substrate further has a peripheral edge 53 which substantially corresponds in shape and size to the aperture 44 and which when assembled substantially occludes the aperture 44. As will be seen in FIG. 5, the semitransparent substrate matingly engages or is coupled with the bezel 47. The semitransparent substrate 50 is formed by depositing a layer of highly reflective material on one of the surfaces of a substantially transparent substrate. Such highly reflective materials may include chromium and other similar materials which are provided to a given thickness and which produce the reflectivity and transmissivity characteristics noted above. The resulting semitransparent substrate 50 is fabricated from suitable substantially transparent substrates such as automotive glass, polycarbonate or other similar materials.

Figure 4:
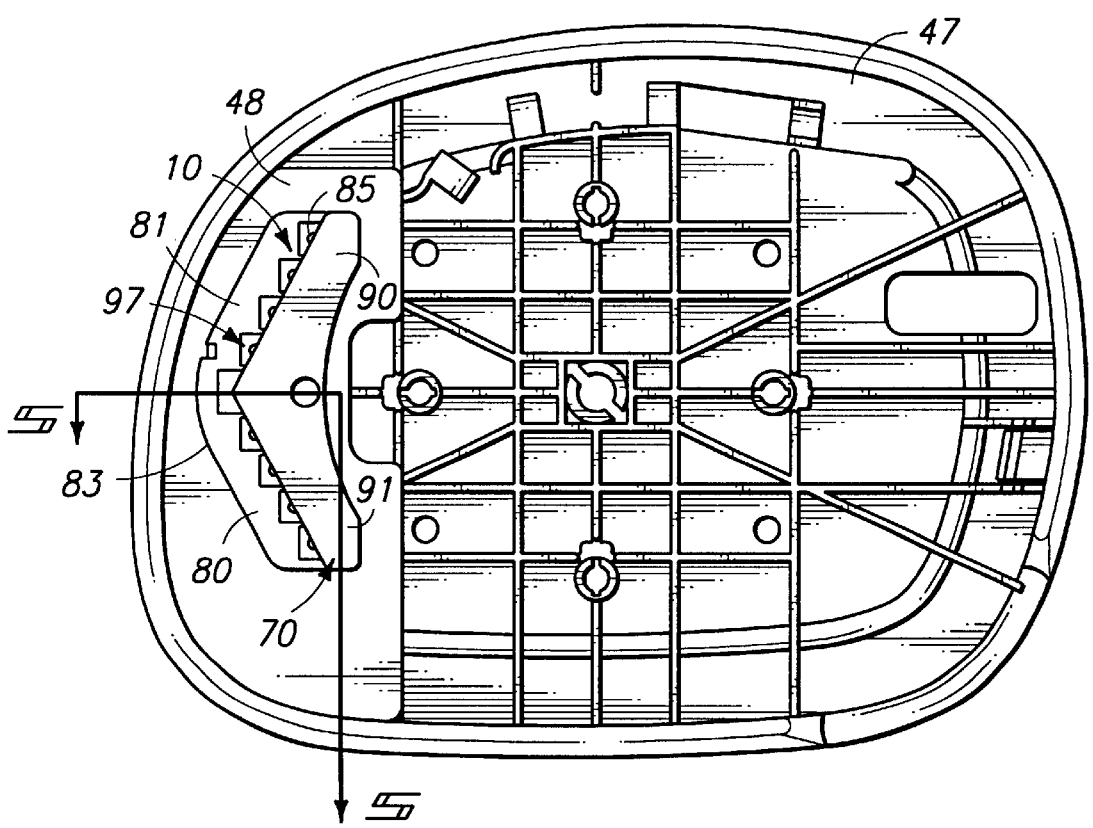
FIG. 4 is a partial, plan view of the signalling assembly of the present invention with the semitransparent substrate removed to illustrate the structure thereunder.
Figure 5:
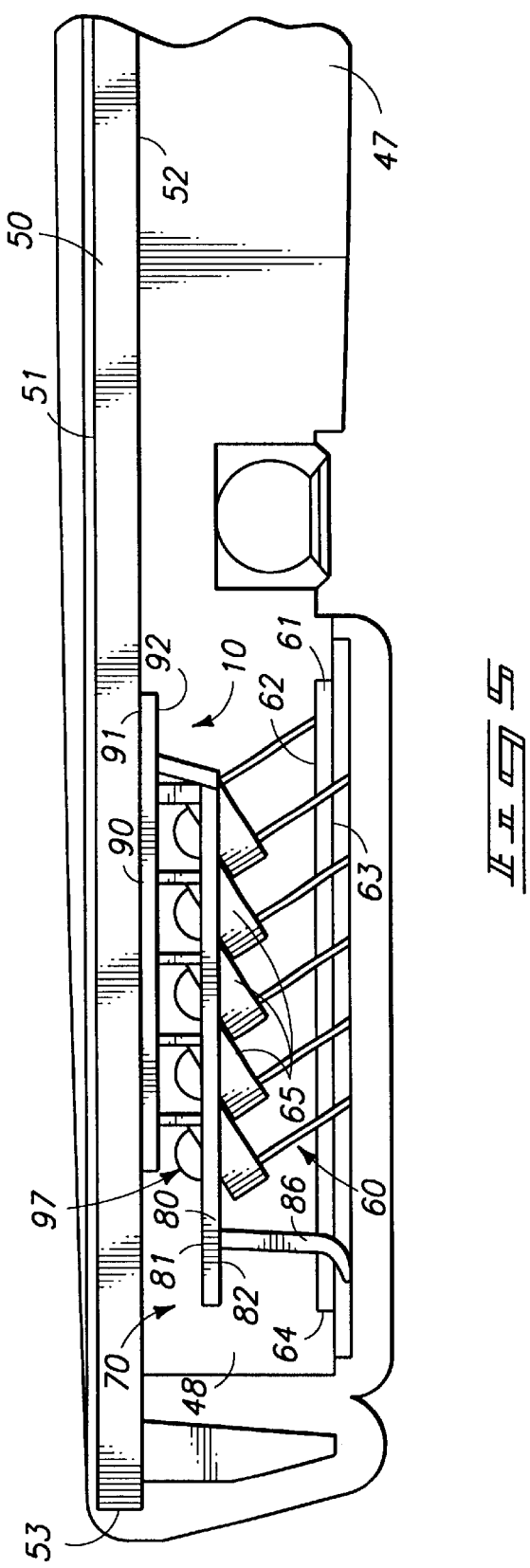
FIG. 5 is a transverse, vertical, sectional view taken from a position along line 5—5 of FIG. 4.

Referring now to FIGS. 3, 4 and 5, respectively, the signalling assembly 10 of the present invention includes a light emitting assembly which is generally designated by the numeral 60. As seen in FIG. 5, the light emitting assembly 60 comprises a supporting substrate 61 which is located in spaced substantially parallel relation relative to the semitransparent substrate 50 and in the cavity 48 which is defined by the bezel 47. The supporting substrate 61 has a top surface 62, and an opposite bottom surface 63. Further, the supporting substrate is defined by a peripheral edge 64. The supporting substrate can take on any number of different geometric shapes depending upon the cavity which it occupies and the ultimate visible image which is intended to be projected. It should be understood that the supporting substrate mounts and electrically couples a plurality of light emitting diodes (LEDs) 65 with the electrical system of the overland vehicle 11. This is achieved by means of electrical tracings which are formed on the supporting substrate [not shown] and which electrically couple the LEDs with the automotive electrical system. The supporting substrate 61 is electrically coupled with the overland vehicle's electrical system by means of electrical leads [not shown] and which travel through the aperture 45 which is formed in the housing 40. As can be best seen by reference to FIG. 5, the light emitting assembly 60 and more particularly the light emitting diodes 65 thereof are disposed in an oblique orientation relative to the supporting substrate 61, and the overlying semitransparent substrate 50. Still further, the light emitting assembly 60 is operable, when energized, to emit visible electromagnetic radiation having a light output of less than about 1000 candelas. Still further, and when fully assembled and energized, the signalling assembly 10 as shown in the arrangement as seen in FIG. 5, has a light output of about 0.5 to about 120 candelas. It should be understood that the oblique orientation of the light emitting assembly 60, and more specifically the light emitting diodes 65 thereof is less than about 45 degrees relative to the semitransparent substrate 50.

As should be understood, the vehicle electrical system may be configured to energize the respective LED's 65 altogether or selectively to achieve a variety of different visibly discernible outputs. Such visibly discernible outputs may include, but are not limited to readily discernible geometric shapes such as a chevron shaped directional signal, alphanumeric indicia; a stop signal; or readily reconfigurable messages which may be selected by or inputed by the operator of the overland vehicle 11.

Figure 6:
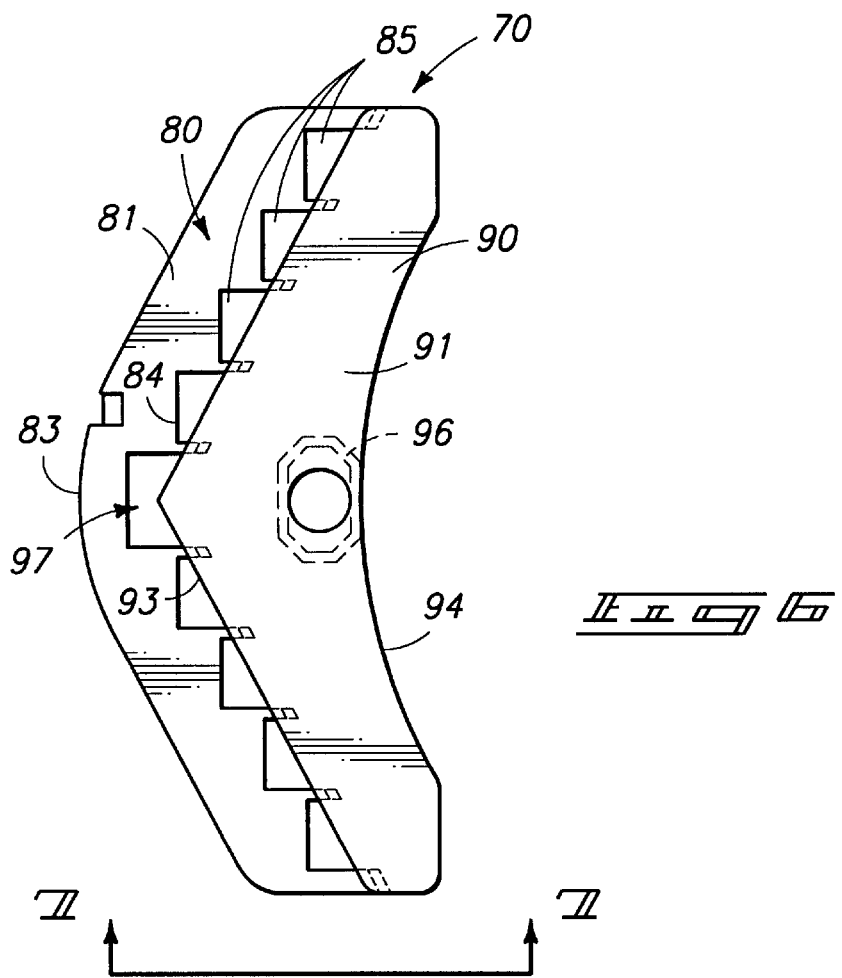
FIG. 6 is a plan view of the opaque light orientation assembly utilized with the signalling assembly of the present invention.
Figure 7:
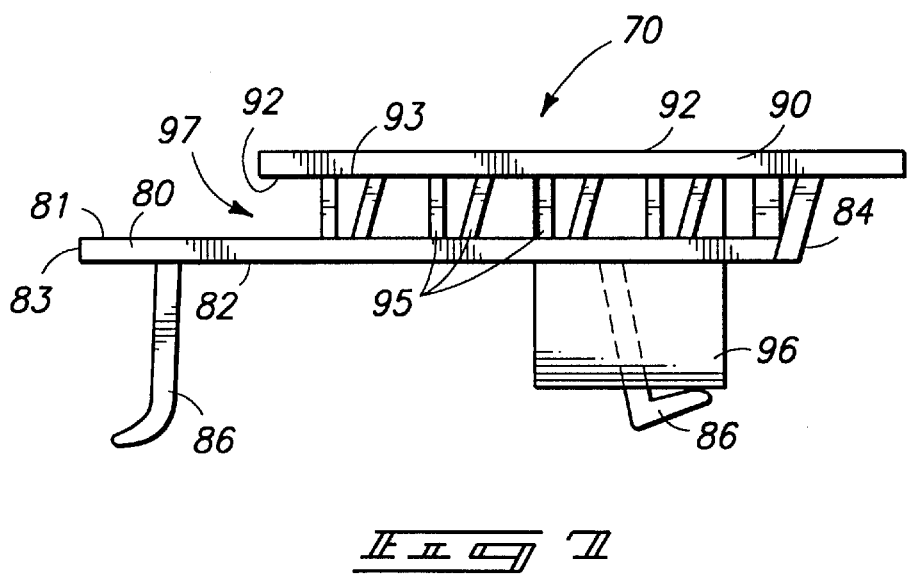
FIG. 7 is an end view of the opaque light orientation assembly utilized with the signalling assembly of the present invention, and which is taken from a position along line 7—7 of FIG. 6.

As best seen in FIGS. 5, 6, and 7, the signalling assembly 10 has an opaque light orientation assembly which is generally designated by the numeral 70. In this regard, the opaque light orientation assembly 70 includes as a component element thereof a light diverting substrate which is located in spaced substantially parallel relation relative to the semitransparent substrate 50. The light diverting substrate 80 has a first or top surface 81 and a second, bottom, or opposite surface 82. The light diverting substrate further is defined by a first peripheral edge 83 and an opposite, second peripheral edge 84. A plurality of pockets or recesses 85 are formed in the second peripheral edge. Still further, the light diverting substrate 80 has a plurality of legs or support members 86 which depend downwardly from the second or bottom surface 82 and which are operable to matingly engage or otherwise couple with the supporting substrate 61. This relationship is seen most clearly in FIG. 5. The light diverting substrate has a surface texture and color which facilitates the scattering and diversion of light which may impinge against its surface, thereby preventing it from being effectively reflected and subsequently passed by the semitransparent substrate 50. This substantially impedes the visual discernment of this assembly behind the semitransparent substrate when the signalling assembly 10 is in a deenergized state.

The opaque light orientation assembly 70 further includes as a second component, an opaque substrate which is generally indicated by the numeral 90. The opaque substrate has a top surface 91 which is juxtaposed and in substantially parallel relation relative to the opposite, rearwardly facing surface 52 of the semitransparent substrate 50. The opaque substrate also has a bottom surface 92 which is disposed in spaced relationship relative to the light diverting substrate 80 and further is disposed in partially overlapping relation relative thereto. The opaque substrate 90 further has a first peripheral edge 93 and an opposite, second peripheral edge 94. The first peripheral edge may be formed in a number of geometric shapes depending upon the image that will be projected by the underlying light emitting assembly 60. Depending legs 95 are made integral with the bottom surface 92 and are thereafter affixed by conventional means to the top surface 81 of the light diverting substrate 80. This is seen in FIG. 7. It should be understood that the opaque substrate and the light diverting substrate 80 may be formed as an integral component, as by conventional techniques, such as molding and the like. The bottom surface 92 further has a central support member 96 which depends downwardly therefrom and forcibly engages the bezel 47. This structure gives additional strength to the opaque light orientation assembly 70. The opaque substrate 90, and the light diverting substrate 80 define, in combination, an aperture 97 in which the obliquely oriented light emitting diodes are positioned. As seen most clearly by reference to FIGS. 4 and 5, the individual light emitting diodes 65 are each positioned or received in the respective recesses 85, which are defined by the light diverting substrate 80. As such, the obliquely oriented electromagnetic radiation generated by the respective light emitting diodes 65 may pass through the aperture 97 in the direction of the semitransparent substrate 50. As should be understood, the overall thickness of the opaque substrate 90, light diverting substrate 80, and light emitting assembly 60 is less than about 25 mm and has a weight of less than about 100 grams. As presently illustrated, the opaque light orientation assembly 70 substantially prevents or impedes the light emitting diodes 65 from being readily visibly discernible through the semitransparent substrate 50 when the light emitting diodes 65 are in a deenergized state. Further and referring again to FIG. 2, when an observer is located in the driver's position 20 and looks along the line of sight 31 in the direction of the signalling assembly 10, the invention is operable, when the light emitting assembly 60 is energized, to emit visible light which is passed by the semitransparent substrate 50 and subsequently acted upon by the opaque light orientation assembly 70 in a fashion whereby the visible electromagnetic radiation is passed by the semitransparent substrate 50 and is predominantly outside the line of sight of the operator.

OPERATION

The operation of the described embodiment of the present invention is believed to be readily apparent and is briefly summarized at this point.

The present invention is best understood by a study of FIGS. 3, 4 and 5 respectively. As shown therein, the signalling assembly 10 comprises a semitransparent substrate 50; a light emitting assembly 60 which is disposed in spaced relation relative to the semitransparent substrate 50, and which, when energized, emits electromagnetic radiation; and an opaque light orientation assembly 70 which is positioned adjacent to the semitransparent substrate, and which permits electromagnetic radiation to pass through the semitransparent substrate at an oblique orientation. As noted earlier, when energized, the light emitting assembly 60 emits visible light which is passed by the semitransparent substrate and which, when acted upon by the opaque light orientation assembly 70, is predominantly outside the line of sight of the operator.

More particularly, the signalling assembly 10 for use with an overland vehicle 11 which has an operator's position 20 comprises a housing 40 borne by the overland vehicle 11 and which defines a cavity 46 having an aperture 44. A semitransparent substrate 50 is borne by the housing 40 and substantially occludes the opening 44 thereof. The semitransparent substrate reflects on average less than about 80% of substantially all visible light and passes less than about 30% of a broad band of visible and invisible electromagnetic radiation. The signalling assembly 10 further includes a light emitting assembly 60 which is disposed in an oblique orientation relative to the semitransparent substrate 50. The light emitted by the light emitting assembly is passed by the semitransparent substrate 50. Additionally, the present invention 10 includes an opaque substrate 90 positioned in partial covering relation relative to the light emitting assembly. The opaque substrate 90 is positioned between the light emitting assembly 60 and the semitransparent substrate 50. The opaque substrate defines, in part, an aperture 97 through which the light emitted by the light emitting assembly passes to the semitransparent substrate 50. Still further, the device 10 includes a light diverting substrate 80 which is disposed in spaced relation relative to the opaque substrate 90 and the semitransparent mirror 50. This light diverting substrate 80 further defines in part, the aperture 97 through which the light emitted by the light emitting assembly 60 passes. In operation, the light emitting diodes 65, which are made integral with the light emitting assembly, emit light in a predetermined band of electromagnetic radiation which is passed by the semitransparent substrate 50. Still further, the light emitting diodes 65, in a deenergized state, cannot be readily visually discerned from their position behind the semitransparent substrate under most ambient lighting conditions. As earlier noted, the semitransparent substrate 50 passes less than about 30% of substantially all visible light and further reflects less than about 80% of substantially all ambient light. In operation, the light output of the light emitting assembly 60 is less than about 1000 candelas and the overall light output of the signalling assembly 10, when assembled and rendered operational is about 0.5 to about 120 candelas. In the present device 10, the semitransparent substrate 50 has a given surface area, and a plurality of light emitting diodes 65 forming the light emitting assembly have a surface area which is less than about 50% of the surface area of the semitransparent substrate 50.

Therefore, it will be seen that the signalling assembly 10 of the present invention provides a convenient means by which the shortcomings in the prior art devices and assemblies can be readily rectified and which further provides a signalling assembly which achieves the benefits earlier described in a cost effective and highly reliable fashion.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A signalling assembly comprising:

a semitransparent substrate which passes less than about 30% of substantially all visible light, and which further reflects less than about 80% of substantially all ambient light;

a light emitting assembly which, when energized, emits electromagnetic radiation as visible light output of about 0.5 to about 120 candelas and which is passed by the semitransparent substrate, the light emitting assembly having a supporting substrate which is disposed in substantially parallel relation relative to the semitransparent substrate, and a plurality of light emitting diodes which are mounted on the supporting substrate and which are obliquely oriented relative to the semitransparent substrate;

a substantially opaque light orientation assembly located adjacent to the semitransparent substrate and which substantially prevents the light emitting diodes from being visibly discernible through the semi-transparent substrate when the light emitting diodes are in a deenergized state, and wherein, the opaque light orientation assembly has an opaque substrate juxtaposed relative to the semitransparent substrate and disposed in partial covering relation relative to the plurality of light emitting diodes, and a light diverting substrate affixed on, and disposed in partial overlapping relation relative to the opaque substrate, and wherein the opaque substrate and light diverting substrate define an aperture in which the light emitting diodes are positioned, and through which the electromagnetic radiation may pass to reach the semitransparent substrate, and wherein the overall thickness of the opaque substrate, light diverting substrate, light emitting assembly, and supporting substrate is less than about 25 millimeters and has a weight of less than about 100 grams.

2. A signalling assembly comprising:

a semitransparent substrate;

a light emitting assembly comprised of a plurality of light emitting diodes which emit light in a predetermined band of electromagnetic radiation and which is obliquely oriented at an angle of less than about 45 degrees relative to the semitransparent substrate and wherein the light emitting diodes in a deenergized state cannot be readily visually discerned behind the semitransparent substrate under most ambient lighting conditions;

an opaque substrate positioned in partial covering relation relative to the light emitting assembly, and located between the light emitting assembly and the semitransparent substrate, and wherein the opaque substrate defines, in part, an aperture, and wherein the light emitting assembly, when energized, emits light which passes through the aperture, and which then passes through the semitransparent mirror;

a light diverting substrate disposed in spaced relation relative to the semitransparent substrate, and defining, in part, the aperture through which the light emitted by the light emitting assembly passes; and a supporting substrate disposed in spaced relation, relative to the opaque substrate, and wherein the light emitting assembly is electrically coupled with the supporting substrate, and is held in the oblique orientation by the supporting substrate, and wherein the overall thickness of the opaque substrate, light diverting substrate, and light emitting assembly is less than about 25 mm, and has a weight of less than about 100 grams.

3. A signalling assembly as claimed in claim 2, wherein the semitransparent substrate is substantially neutrally chromatic and passes at least about 1% to about 30% of substantially all visible light, and further reflects less than about 80% of substantially all ambient visible light.

4. A signalling assembly as claimed in claim 3, wherein the light emitting assembly, opaque substrate, light diverting substrate, and supporting substrate has a weight of less than about 100 grams, and a light output of less than about 1000 candelas, and wherein the signalling assembly has a light output of about 0.5 to about 120 candelas.

5. A signalling assembly for use with an overland vehicle which has an operators position, comprising:

a housing borne by the overland vehicle and which defines a cavity having an aperture, and wherein an operator, located in the operators position, has a line of sight which includes the signalling assembly;

a semitransparent substrate borne by the housing and substantially occluding the aperture thereof, the semitransparent substrate reflecting less than about, on average, 80% of substantially all visible light, and passing less than about 30% of a given band of electromagnetic radiation;

a light emitting assembly comprised of a plurality of light emitting diodes which emit light in a predetermined band of electromagnetic radiation disposed in an oblique orientation which is less than about 45 degrees relative to the semitransparent substrate, and wherein the light emitting assembly, when energized, emits lights which passes through the semitransparent substrate, and which further is predominately outside of the line of sight of the observer who is located in the operators position and wherein the light emitting diodes, in a deenergized state, cannot be readily visually discerned from their position behind the semitransparent substrate under most ambient lighting conditions;

an opaque substrate positioned in partial covering relation relative to the light emitting assembly and the semitransparent mirror, the opaque substrate defining in part, an aperture through which light emitted by the light emitting assembly passes to the semitransparent substrate;

a light diverting substrate disposed in spaced relation relative to the opaque substrate and the semitransparent substrate, and which further defines, in part, the aperture through which light emitted by the light emitting assembly passes; and a supporting substrate disposed in spaced relation relative to the opaque substrate, and wherein the light emitting assembly is electrically coupled with the supporting substrate and is held in the oblique orientation relative to the semitransparent substrate by the supporting substrate, and wherein the overall thickness of the opaque substrate, light diverting substrate, light emitting assembly, and supporting substrate is less than about 25 mm, and has a weight of less than about 100 grams.

6. A signalling assembly as claimed in claim 5, wherein the semitransparent substrate passes less than about 30% of substantially all visible light, and which further reflects less than about 80% of substantially all ambient visible light.

7. A signalling assembly as claimed in claim 6, wherein the light output of light emitting assembly is less than about 1000 candelas, and wherein the signalling assembly has a light output of about 0.5 to about 120 candelas.

8. A signalling assembly as claimed in claim 7, wherein the semitransparent substrate has a given surface area, and wherein the plurality of light emitting diodes forming the light emitting assembly have a surface area which is less than about 50% of the surface area of the semitransparent substrate.

9. A signalling assembly for use on an overland vehicle which has an operators position, comprising:

a housing borne by the overland vehicle and which defines a cavity having an aperture;

a semitransparent substrate borne by the housing and substantially occluding the opening thereof, the semitransparent substrate having a given surface area and reflecting on average, less than about 80% of substantially all visible light, and passing less than about 30% of a given band of electromagnetic radiation;

a plurality of light emitting diodes forming a light emitting assembly and which is disposed in the cavity, and wherein the light emitting diodes are disposed in an oblique orientation relative to the semitransparent substrate, and wherein the light emitted by the light emitting assembly is passed by the semitransparent substrate, and wherein the light emitting assembly emits less than about 1000 candelas, and further has a surface area of less than about 50% of the surface area of the semitransparent substrate;

an opaque substrate positioned in partial covering relation relative to the light emitting assembly, and positioned between the light emitting assembly and the semitransparent substrate, the opaque substrate juxtaposed and in substantially parallel spaced relation relative to the semitransparent substrate and defining, in part, an aperture through which light emitted by the light emitting assembly passes through to the semitransparent substrate; and an opaque light diverting substrate disposed in spaced substantially parallel relation relative to the opaque substrate and the semitransparent substrate and which further defines, in part, the aperture through which light emitted by the light emitting assembly passes, and wherein the signalling assembly emits less than about 120 candelas.

10. A signalling assembly as claimed in claim 9, wherein the opaque substrate and the light diverting substrate are affixed together.

11. A signalling assembly as claimed in claim 10, and further comprising a supporting substrate which is disposed in spaced substantially parallel relation relative to the light diverting substrate, and wherein the light emitting diodes are mounted on and electrically coupled with the supporting substrate.

12. A signalling assembly as claimed in claim 11, and further comprising a bezel which is received in the cavity and which mounts the semitransparent substrate, and wherein the opaque substrate, light diverting substrate and the supporting substrate are mounted on the bezel.

13. A signalling assembly, comprising:

a semi-transparent substrate;

a light emitting assembly which is disposed in spaced relation relative to the semi-transparent substrate and which when energized emits electromagnetic radiation, and wherein the light emitting assembly further includes a plurality of light emitting diodes; and an opaque light orientation assembly which is positioned adjacent to the semitransparent substrate and which permits electromagnetic radiation to pass through the semitransparent substrate at an oblique orientation, and wherein the plurality of light emitting diodes forming the light emitting assembly have a surface area which is less than about 50% of the surface area of the semitransparent substrate, and wherein the light emitting diodes, in a deenergized state, cannot be readily visually discerned behind the semitransparent substrate under most ambient lighting conditions.

* * * * *